US006705233B2

(12) United States Patent
Spiewak et al.

(10) Patent No.: US 6,705,233 B2
(45) Date of Patent: Mar. 16, 2004

(54) EXPANDABLE PAINTING WAGON HAVING A RACK AND PINION DRIVE MECHANISM

(75) Inventors: Bradley Spiewak, Alcona Beach (CA); Henry R. Draper, Dunsford (CA)

(73) Assignee: Decoma International Corp., Concord (CA)

( * ) Notice: Subject to any disclaimer, the term of this patent is extended or adjusted under 35 U.S.C. 154(b) by 0 days.

(21) Appl. No.: 10/297,797

(22) PCT Filed: Jun. 11, 2001

(86) PCT No.: PCT/CA01/00844

§ 371 (c)(1), (2), (4) Date: Dec. 9, 2002

(87) PCT Pub. No.: WO01/94026

PCT Pub. Date: Dec. 13, 2001

(65) Prior Publication Data

US 2003/0136296 A1 Jul. 24, 2003

Related U.S. Application Data

(60) Provisional application No. 60/210,881, filed on Jun. 9, 2000.

(51) Int. Cl.[7] .................................................. B23Q 3/08
(52) U.S. Cl. ....................... 104/172.3; 280/638; 269/17
(58) Field of Search ........................... 104/172.1, 172.2, 104/172.3, 162, 165, 163, 169; 118/630, 500; 280/638, 35, 79.3; 269/17, 37, 40, 42, 43, 45, 55, 58, 60, 68, 71; 105/380, 385

(56) References Cited

U.S. PATENT DOCUMENTS

| | | | | |
|---|---|---|---|---|
| 4,548,135 A | * | 10/1985 | Kupczyk | 104/135 |
| 4,834,607 A | * | 5/1989 | Back | 414/267 |
| 5,249,823 A | * | 10/1993 | McCoy et al. | 280/656 |
| 5,350,162 A | * | 9/1994 | Cushing | 269/13 |
| 5,497,060 A | * | 3/1996 | Juergens, III | 700/60 |
| 5,772,233 A | | 6/1998 | Papendick | |
| 5,879,021 A | * | 3/1999 | Papendick | 280/638 |
| 6,367,788 B1 | * | 4/2002 | Babchuk | 269/45 |

* cited by examiner

*Primary Examiner*—Mark T. Le
(74) *Attorney, Agent, or Firm*—Clark Hill PLC

(57) ABSTRACT

A paint wagon (10) has a base (22) having a plurality of wheels (28, 30) mounted in supporting relation thereto. A drop pin (32) is slidably mounted to the base. The drop pin (32) selectively engages with a conveyor (12) for translating the paint wagon (10) along a path. A plurality of slidably mounted mounting fixtures (26) are movable between a contracted position and an expanded position. An actuating assembly (24) slidably mounts the mounting fixtures to the base. The actuating assembly (24) has a longitudinal support (38) and a plurality of cars (52, 54, 56) in sliding engagement with the longitudinal support. The mounting fixtures (26) extend from the plurality of cars. A rotatably mounted pinion (70) drivingly engages a rack (84, 86) which is slidably mounted with the longitudinal support. The rack (84, 86) is connected to an outer car (56). The rack has a plurality of tabs (90, 92) extending therefrom positioned to selectively engage inner cars (52, 54) to move the inner cars and automatically space the cars. An actuating mechanism (20) is mounted on the path. The actuating assembly (24) selectively engages the actuating mechanism (20) as the paint wagon (10) travels along the path to effect rotation of the pinion (70) and responsively effect the movement of the mounting fixtures (26) between the contracted and expanded positions.

14 Claims, 7 Drawing Sheets

EXPANDABLE PAINTING WAGON HAVING A RACK AND PINION DRIVE MECHANISM

This application claims the benefit of Provisional application No. 60/210,881 filed Jun. 9, 2000.

FIELD OF THE INVENTION

The present invention relates to a paint wagon for carrying a plurality of components to be painted through a painting facility. In particular, this invention relates to an expandable paint wagon which can be easily expanded and contracted at desired locations.

BACKGROUND OF THE INVENTION

Paint wagons are commonly used to carry exterior components of motor vehicles through a paint facility. U.S. Pat. No. 5,772,233 describes a typical paint wagon used for two tone fascias. The paint wagon contracts prior to entry into the paint facility so that one fascia will partially shroud a next adjacent fascia. After painting, the wagon expands to allow removal of the fascia from the wagon.

More commonly, paint wagons are not expandable and have mounting fixtures which are rigidly mounted to the wagon. These wagons are used primarily because they are easy to build and have no moving parts which can foul with each trip through the paint facility. However, fixed mount paint wagons limit the throughput of the paint facility since each wagon requires a minimum of space along the conveyor to allow the wagons to run corners. In many cases, the fascia must be spaced apart to allow the painting robot to fit between the parts and to allow the mounting and removal of the fascia onto and from the paint wagon. At other times, the non-expandable wagons take up valuable space along the conveyor system.

The expandable wagon as described in U.S. Pat. No. 5,772,233 could easily be modified to expand prior to entry into the paint facility and contract after and at other desired locations. However, the prior art expandable wagons require contact with a fixed rigid structure to expand and contract. Usually, a pole is mounted on the floor adjacent the travel of the paint wagons to effect the movement of the paint wagon. Although a number of poles could be installed about the conveyor, these poles would present safety problems. Further, the greater number of poles may interfere with other fixtures mounted on the paint wagons. Other fixtures are utilized when parts other than fascia are required to be painted. Thus, the addition of poles is not a safe and economical solution to modifying paint wagon length.

SUMMARY OF THE INVENTION

The disadvantages of the prior art may be overcome by providing an expandable paint wagon having a simple actuating mechanism which can be triggered by a low profile mechanism.

According to one aspect of the invention, there is provided a paint wagon which has a base having a plurality of wheels mounted in supporting relation thereto. A drop pin is slidably mounted to the base. The drop pin selectively engages with a conveyor for translating the paint wagon along a path. A plurality of slidably mounted mounting fixtures is movable between a contracted position and an expanded position. An actuating assembly slidably mounts the mounting fixtures to the base. The actuating assembly has a longitudinal support and a plurality of cars in sliding engagement with the longitudinal support. The mounting fixtures extend from the plurality of cars. A rotatably mounted pinion drivingly engages a rack which is slidably mounted with the longitudinal support. The rack is connected to an outer car. The rack has a plurality of tabs extending therefrom positioned to selectively engage inner cars to move the inner cars and automatically space the cars. An actuating mechanism is mounted on the path. The actuating assembly selectively engages the actuating mechanism as the paint wagon travels along the path to effect rotation of the pinion and responsively effect the movement of the mounting fixtures between the contracted and expanded positions.

BRIEF DESCRIPTION OF THE DRAWINGS

A preferred embodiment of the invention will now be described, by way of example only, with reference to the attached Figures, in which.

DETAILED DESCRIPTION OF THE PREFERRED EMBODIMENT

Figure 1:
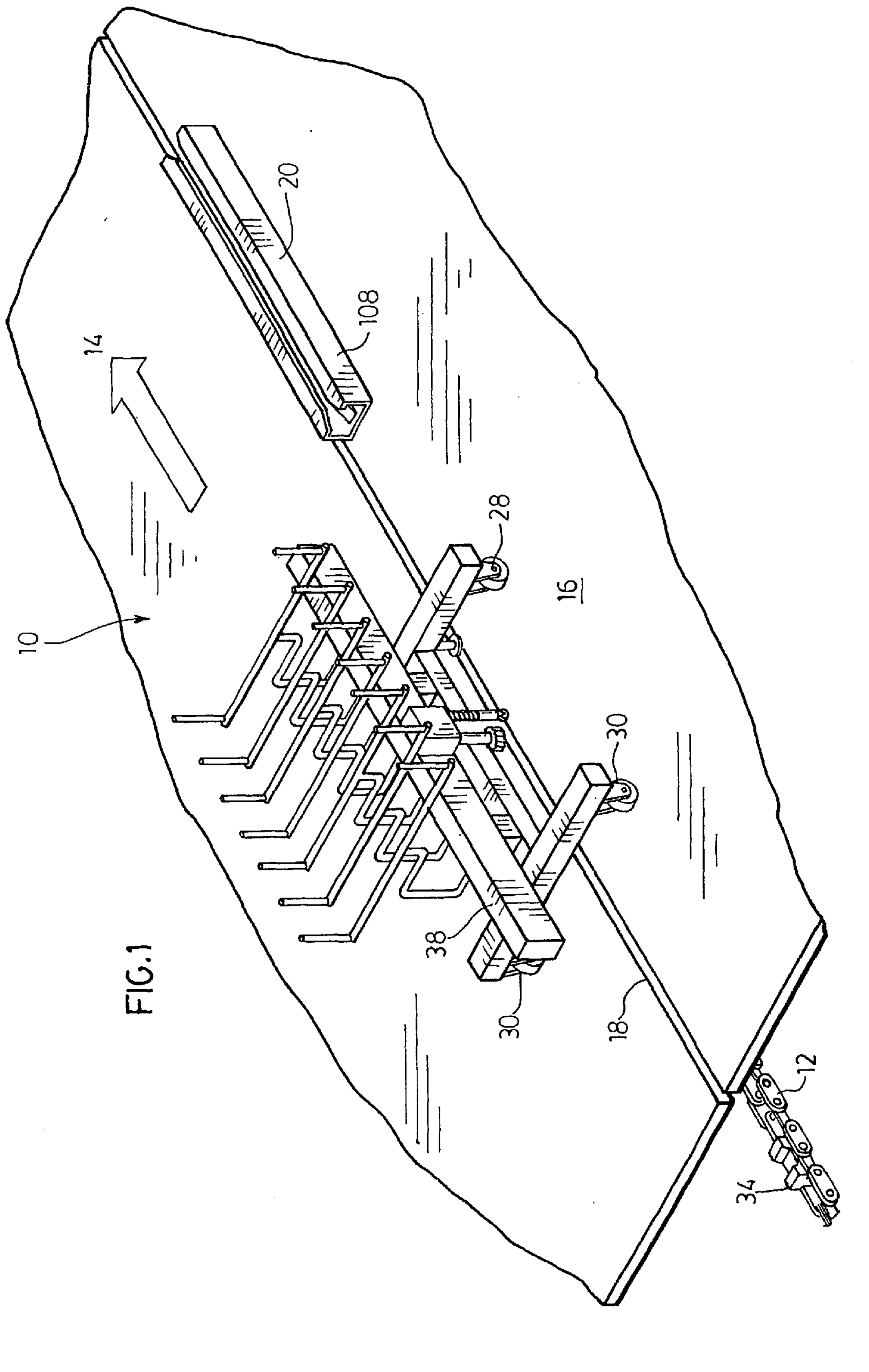
FIG. 1 is a perspective view of a paint wagon with actuating mechanism of the present invention.

Referring to FIG. 1, an expandable paint wagon 10 of the present invention is shown. The paint wagon 10 travels along a conveyor 12 in the direction indicated at 14. The conveyor 12 is conventionally mounted below floor 16 and accessed through a slot 18.

An actuating mechanism 20 is mounted on the floor 16 adjacent to the slot 18. Actuating mechanism 20 is generally elongate and extends in the same general direction as the slot 18.

Figure 2:
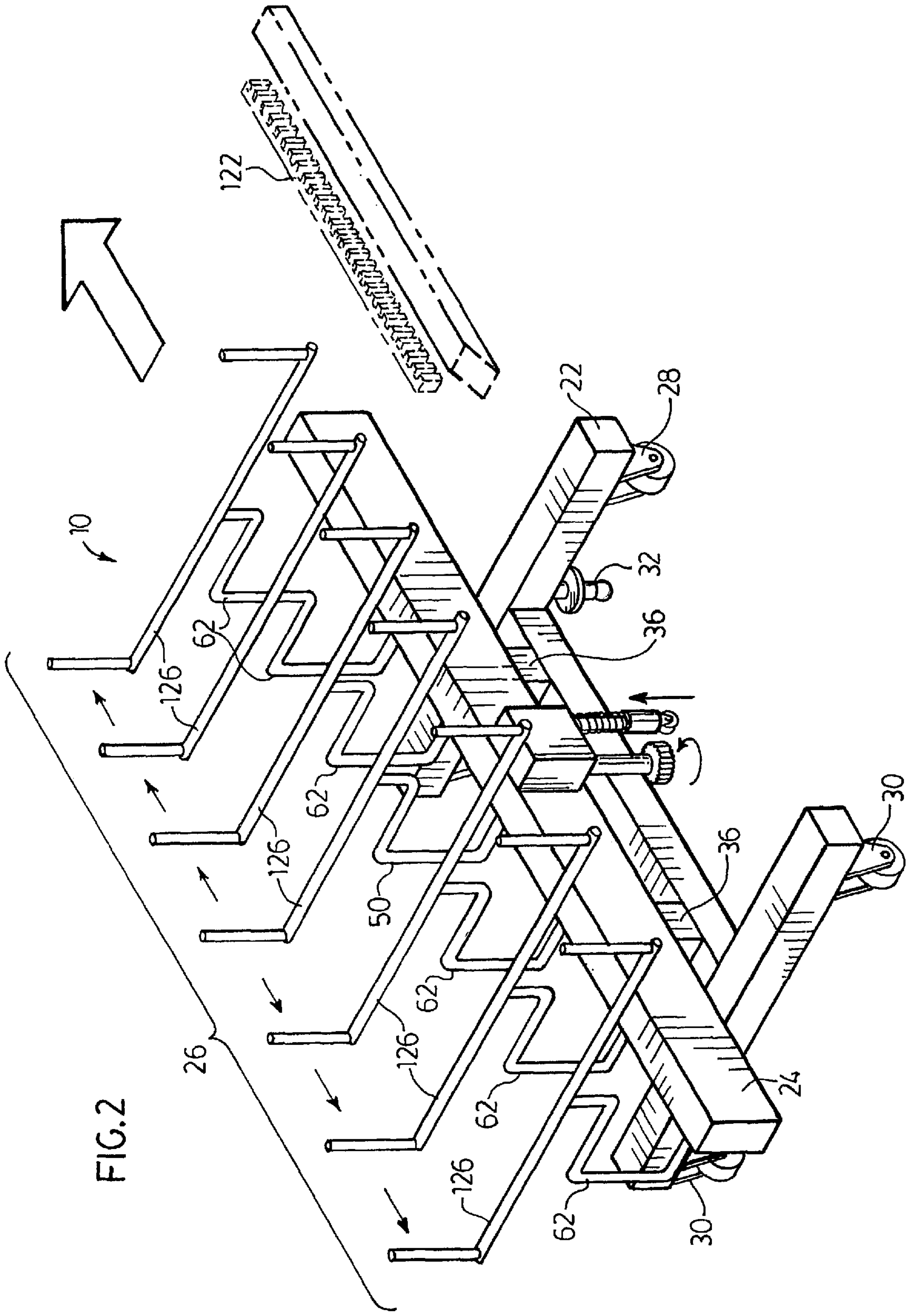
FIG. 2 is a perspective view of the paint wagon and actuating mechanism of FIG. 1.

Referring to FIG. 2, the paint wagon 10 is illustrated in greater detail. The paint wagon 10 generally comprises a base frame 22, an actuating assembly 24 and a fixture mounting assembly 26. Actuating assembly 24 is mounted on the base frame 22. Fixture mounting assembly 26 is operably mounted on the actuating assembly 24 for responsive movement between an expanded condition (FIG. 2) and a contracted condition (FIG. 1).

Base frame 22 is preferably an H-shaped frame having wheel assemblies 28, 30 suitably mounted at each of the four legs of the H-shaped frame to support the paint wagon 10. Preferably wheel assemblies 28 are caster wheels which allows the paint wagon 10 to be guided along and steered.

A drop pin 32 is slidably mounted at the front of the frame 22. The drop pin 32 extends downwardly to engage a socket 34 on the conveyor chain 12. When engaged with the conveyor chain 12, the drop pin 32 provides a driving engagement to the paint wagon 10 to translate the paint wagon 10 along floor 16. The drop pin 32 is lifted to disengage the paint wagon 10 from the conveyor chain 12.

Figure 4:
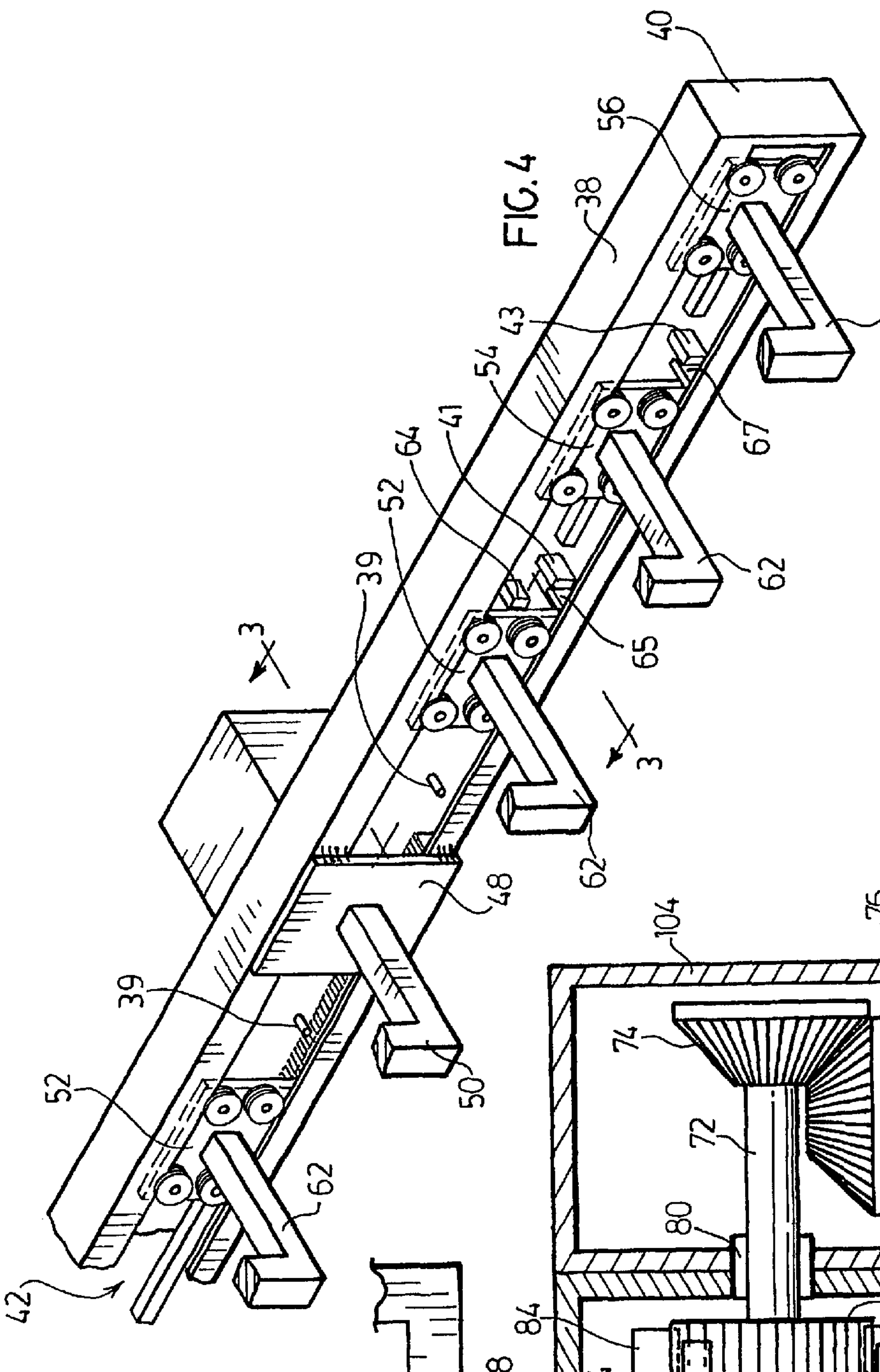
FIG. 4 is a partial perspective view of the actuating assembly of the paint wagon of FIG. 1.
Figure 3:
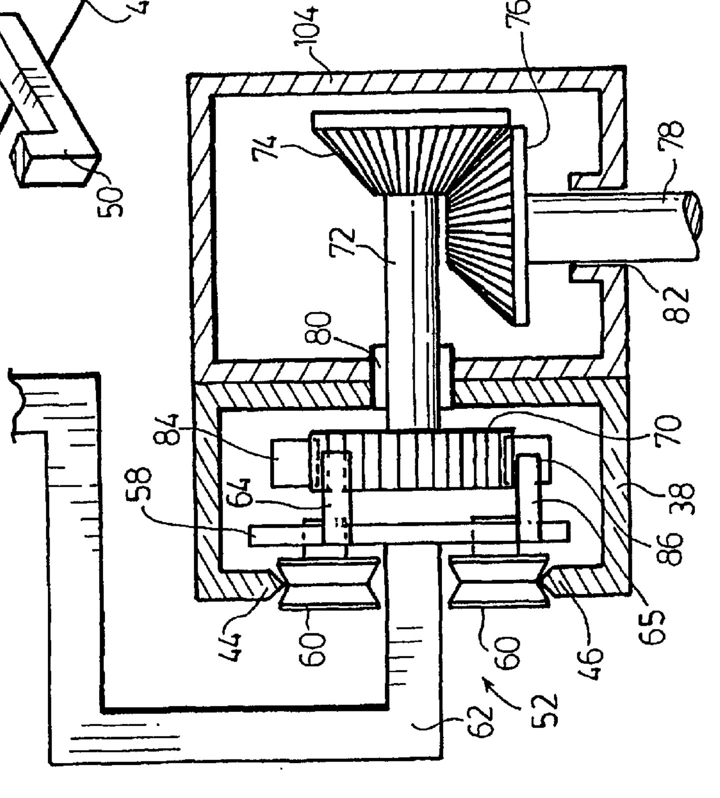
FIG. 3 is a partial sectional view of the actuating assembly of the paint wagon of FIG. 1.

Referring to FIGS. 3 and 4, the actuating assembly 24 comprises an elongated C-shaped longitudinal support 38 having closed ends 40. Longitudinal support 38 is mounted on spacers 36. An elongate channel 42 extends longitudinally along one side of the longitudinal support 38. The upper edge 44 and the lower edge 46 of the channel 42 define guides. A fixed plate 48 is welded to the longitudinal support 38 across the open channel 42. Stationary mounting arm 50 extends from plate 48.

Inner cars 52, middle cars 54 and end cars 56 are mounted on the upper and lower guides 44, 46 for sliding movement outwardly and inwardly relative to fixed plate 48.

Actuating assembly 24 is symmetrical about a diagonal across plate 48 and therefore only one side will be described in detail.

Each of the cars 52, 54, 56 has a mounting plate 58 on which rollers 60 are rotatably mounted. Preferably, four rollers 60 are spaced about one face of mounting plate 58 so that the rollers engage guides 44, 46. The rollers 60 mount the cars 52, 54, 56 for guided travel along the actuating assembly. A mounting arm 62 extends outwardly from the mounting plate 58. Cars 52, 54, 56 are identical except that inner cars 52 have a tab 64 projecting from the leading edge when the cars are moving in an expanding direction and middle cars 54 have a tab 66 projecting from trailing edge when the cars are moving in an expanding direction. Middle cars 54 and outer cars 56 each has a spacer bar 68 extending from the leading edge when the cars are moving in a contracting direction.

Actuating assembly 24 further comprises a pinion 70 mounting on a drive shaft 72. Bevel gear 74 is also mounted on the drive shaft 72 on an end opposite pinion 70. Bevel gear 74 drivingly engages a matching bevel gear 76 which is mounted on a vertically extending shaft 78. Bearings 80, 82 are provided to journal mount shafts 72, 78, respectively.

Racks 84, 86 are slidably mounted within longitudinal support 38. The distal end of each rack 84, 86 is affixed to the outer cars 56. Racks 84, 86 each has a set of teeth 88 along a near end thereof for engaging with pinion 70. Racks 84, 86 extend in opposite directions on opposite sides of the pinion 70. Rotation of pinion 70 in a first sense will move both racks 84, 86 outwardly in an expanding direction and rotation in the opposite sense will move both racks 84, 86 inwardly in a contracting direction.

Figure 10:
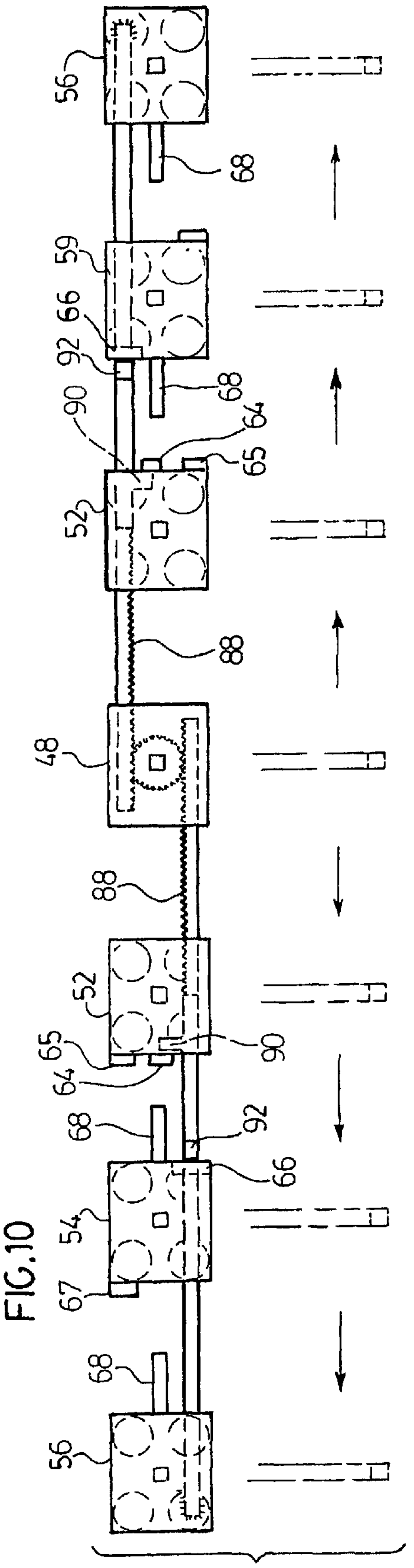
FIG. 10 is a side schematic view of the actuating assembly of the paint wagon of FIG. 1, moving to an expanded position.
Figure 11:
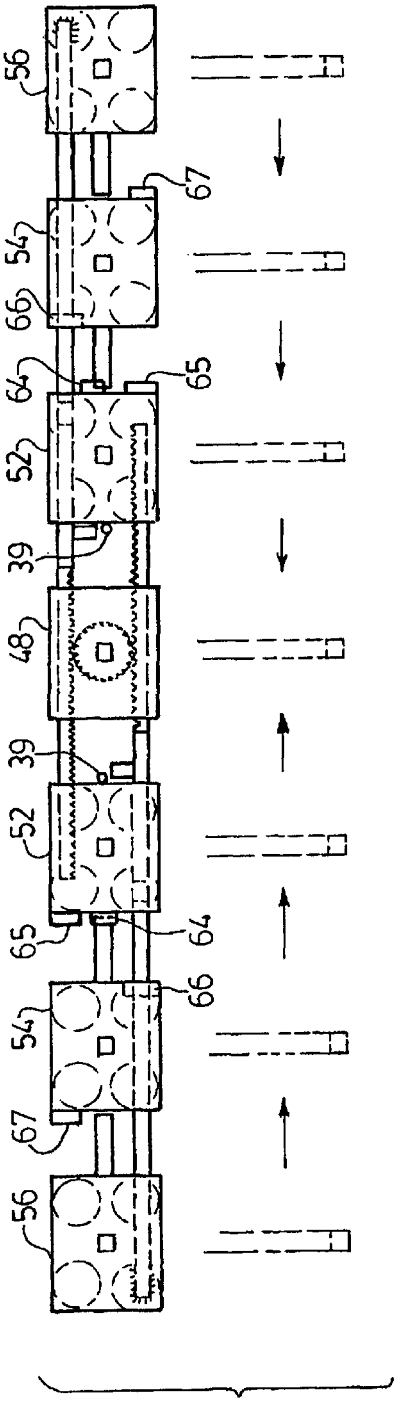
FIG. 11 is a side schematic view of the actuating assembly of the paint wagon of FIG. 1, moving to a contracted position.

Racks 84, 86 each has an inner tab 90 and a middle tab 92 (See FIGS. 10, 11). Middle tab 92 extends is a direction orthogonal from inner tab 90. Tabs 90, 92 are spaced at a distance to provide a desired separation between parts to be painted. Inner tab 90 will contact tab 64 on inner cars 52 when the racks 84, 86 are moving in the expanding direction and urge the inner cars 52 in the expanding direction. Middle tab 92 will contact tab 66 on middle cars 54 when the racks 84, 86 are moving in the expanding direction and urge the middle cars 54 in the expanding direction. Middle tab 92 and inner tab 90 are orthogonal so that the racks 84, 86 will only engage the middle cars 56 and the inner cars 52, respectively, during expanding movement and not during contracting movement.

Figure 5:
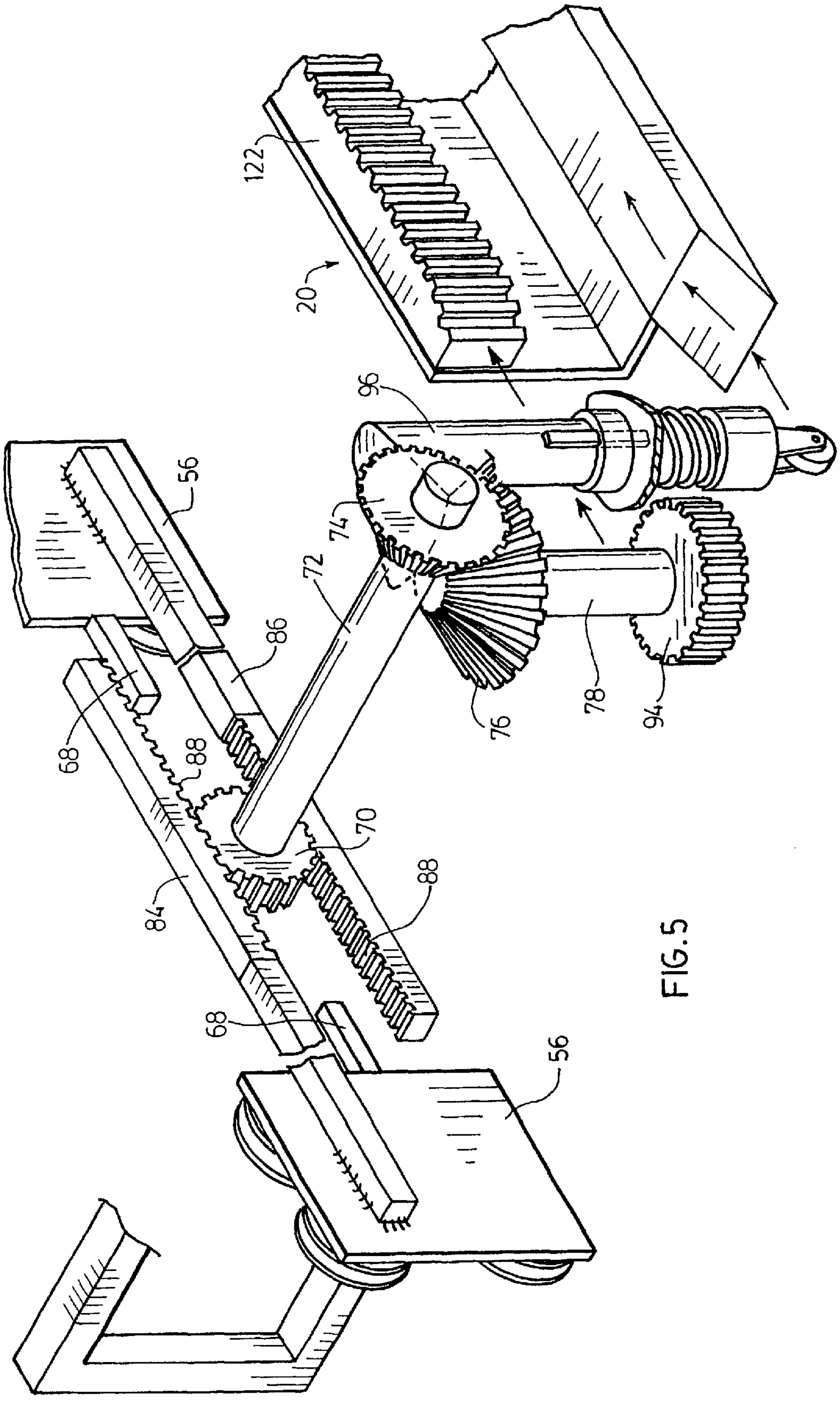
FIG. 5 is a partial perspective view of the actuating assembly of the paint wagon of FIG. 1.
Figure 6:
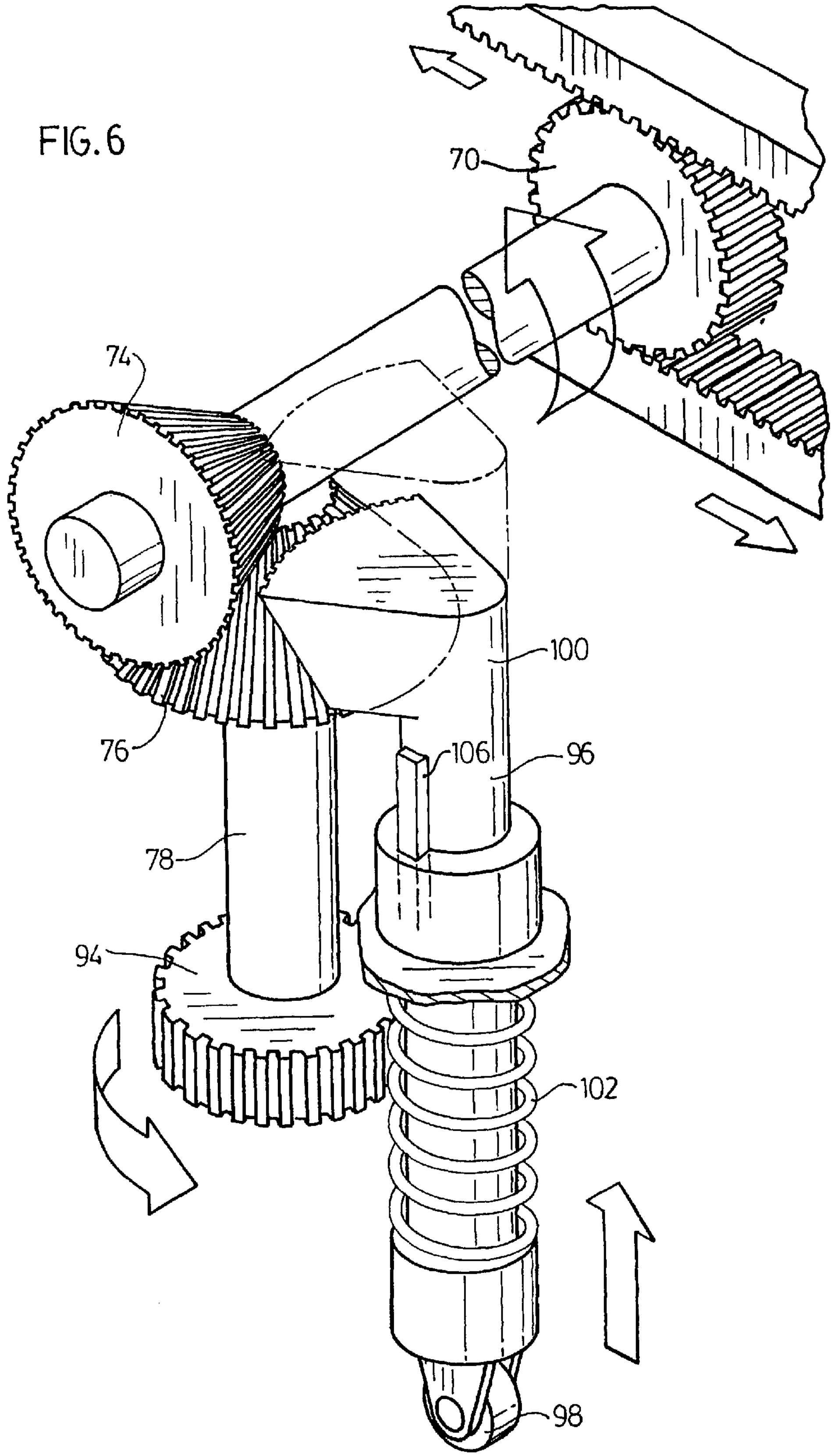
FIG. 6 is a partial perspective view of the locking mechanism of the actuating assembly of the paint wagon of FIG. 1.

Referring to FIGS. 5 and 6, the lower end of shaft 78 has a spur gear 94. Mounted in front of and parallel to shaft 78 is a lock shaft 96. Lock shaft 96 has a floor engaging roller 98 at the lower end and a section of a bevel gear 100 at the upper end. A spring 102 mounts between the housing 104 and the lock shaft 96 to bias the lock shaft to the down or lock position. Lock shaft 96 has a key 106 which prevent rotation of the lock shaft and limits movement to the vertical direction. In the lock position, bevel gear 100 engages bevel gear 76 to prevent rotation thereof.

Figure 7:
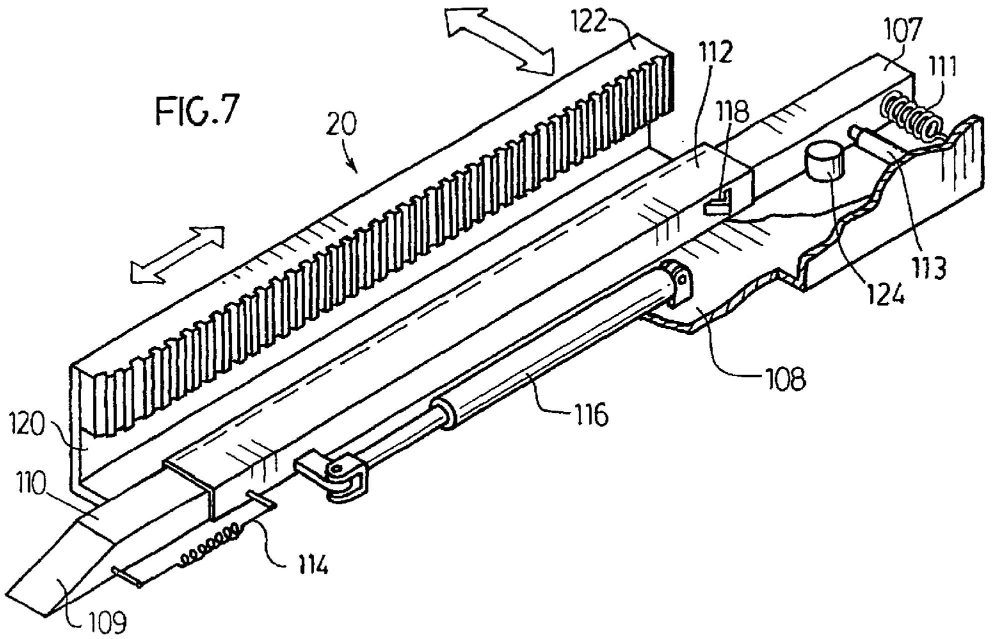
FIG. 7 is a perspective view of the actuating mechanism of the paint wagon of FIG. 1.

Referring to FIG. 7, the floor mounted actuating mechanism 20 is illustrated in greater detail. The cover 108 has been removed to show the inner detail. Bar 110 is pivotally mounted on cover 18 near the leading edge thereof. Bar 110 has a ramp 109 and an elevated surface 107 for receiving roller 98 of lock shaft 96 and urging the lock shaft 96 upwardly to the raised position and to unlock the actuating assembly 24. Bar 110 has a spring 111 extending between the trailing end and the cover 108. A shock absorber 113 also extends from the trailing end and the cover 108. The spring 111 and shock absorber 113 control the pivotal movement of the bar 110.

A sleeve 112 is slidably mounted on bar 110 for travel in the direction of travel 14. A spring 114 extends between the sleeve 112 and bar 110 and urges the sleeve towards the leading edge of the cover 108. A shock absorber 116 is pivotally mounted at one end to the sleeve 112 and pivotally mounted at the opposite end to the cover 108. Sleeve 114 has an abutment 118 at the trailing end thereof. Sleeve 112 has an L-shaped flange 120 having a rack of teeth 122 which are complementary to and operatively engage the bevel gear 94. The leading edge of the rack of teeth 122 is slightly tapered to allow smooth engagement between the teeth 122 and bevel gear 94.

Cover 108 has a stop 124 positioned near the trailing end of the cover 108. Bar 110 will rest against the stop 124 under the influence of spring 111. Stop 124 will also engage abutment 118 of sleeve 112 as the sleeve 112 is moved towards the trailing end which will cause the sleeve 112 and the rack of teeth 122 to pivot outwardly to disengage the rack of teeth 122 from the bevel gear 94.

Cover 108 is firmly attached to the floor 16, adjacent the slot 18. Cover 108 is generally a C-shaped extrusion having an open channel facing upwardly and extending in the direction of travel. The leading edge of the slot is preferably tapered to receive lock shaft 96.

Referring back to FIG. 2, the fixture mounting assembly 26 comprises a plurality of U-shaped supports 126. Each of the supports 126 are mounted on one of the fixed arm 50 or movable arms 62. In the preferred embodiment, the paint wagon has seven mounting fixtures, six movable fixtures and one stationary fixture. It is apparent to those skilled in the art that any number of fixtures could be accommodated.

Housing 104 shrouds the gear or operating components of the paint wagon 10 from paint over spray. Preferably, cars 52, 54 and 56 are made from stainless steel in order to minimize damage from the paint and the requisite cleaning solvents needed to clean and remove over sprayed paint. The preferred shape of mounting arms 62 is as illustrated in FIG. 2. The shape allows a further shroud to be placed over the channel 42 further minimizing the risk of paint being applied to the cars 52, 54 and 56.

In operation, the paint wagon 10 of the present invention is selectively engaged to the conveyor 12. The paint wagon

10 will be pulled about in the direction of travel 14. In this condition, the lock shaft 96 will be in the down or locked position, holding the fixture mounting assembly 26 in place in the contracted condition. The paint wagon 10 will encounter one of a desired number of actuating mechanisms 20.

Referring to FIG. 5, the roller 98 will engage the ramp 109 which will lift the lock shaft 96 upwardly, disengaging the bevel gear 94 of the actuating assembly 24. As the paint wagon 10 travels along, spur gear 94 will engage rack of teeth 122 which will cause rotation thereof in an expanding sense. Rotation of spur gear 94 will in turn rotate pinion 70, which in turn will cause outwardly movement of the racks 84, 86.

Referring to FIGS. 10 and 11, the outward movement of the racks 84, 86 will cause direct movement of the outer cars 56, since racks 84, 86 is directly connected to one of the outer cars 56. Inner tab 90 and middle tab 92 will contact tabs 64 and 66, respectively, to move cars 52, 54 to each respective expanded position.

Figure 8:
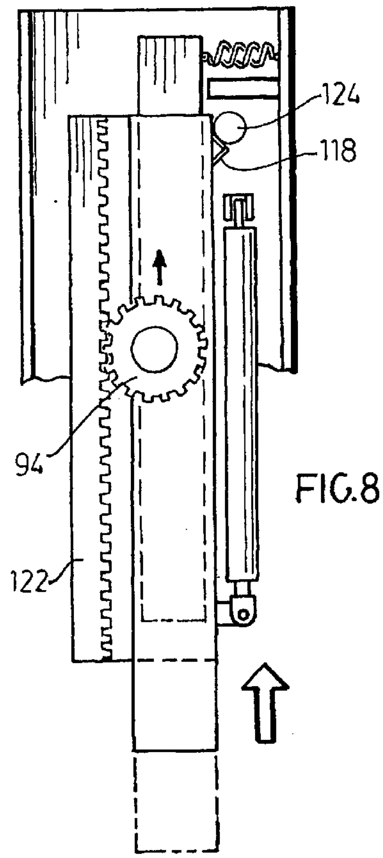
FIG. 8 is a top plan view of the actuating mechanism of FIG. 7 in an engaged position.
Figure 9:
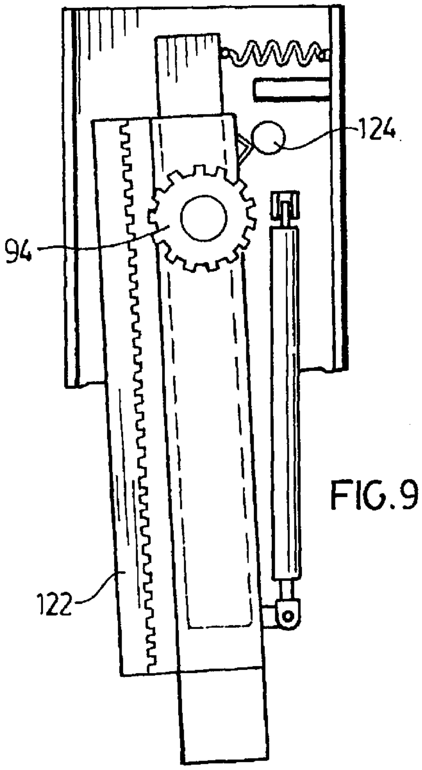
FIG. 9 is a top plan view of the actuating mechanism of FIG. 7 in a disengaged position.

Referring to FIGS. 7, 8 and 9, the disengagement of the actuating mechanism 24 is illustrated. Once the paint wagon 10 has reached the expanded position, the racks 84, 86 will stop moving. This will cause pinion 70 to stop rotating and in turn stop spur gear 94 from rotating. If the spur gear 94 has not disengaged from the rack of teeth 122, the spur gear 94 will cause the rack of teeth 122 and sleeve 112 to slide along the bar 110 until abutment 118 engages stop 124. Engagement of the abutment 118 with stop 124 will cause bar 110 and the sleeve 112 to pivot outwardly to cause the rack of teeth 122 to disengage from the spur gear 94. Once the spur gear 94 has traveled beyond the rack of teeth 122, the spring 111 will return the bar 110 and sleeve 112 back to a ready position in parallel to the direction of travel 14. Once the paint wagon 10 has traveled beyond the bar 110, the lock shaft 96 will fall off the trailing edge of the bar 110 allowing the lock shaft to move downwardly to the lowered position to re-engage the bevel gear 100 with the bevel gear 76, locking the actuating assembly 24 in place.

To contract the paint wagon 10, an actuating mechanism 20 is mounted on the floor 16. The contracting actuating mechanism 20 is a mirror image of the mechanism shown in the FIGS. 7, 8, and 9. The rack of teeth 122 will be on the opposite side of the bar 110 and will rotation of the spur gear 94 in a contracting sense opposite the expanding sense.

Rotation of the spur gear 94 in the contracting sense will cause rotation of the pinion 70 in the contracting sense. Pinion 70 will cause racks 84, 86 to move inwardly. Racks 84, 86, will move the outer cars 56 inwardly which will urge middle cars 54 inwardly and then inner cars 52 inwardly to the contracted position. Bars 68 will space the outer cars 56 from the middle cars 54 from the inner cars 52. By selecting the length of bars 68, a minimum spacing between supports 126 is determined.

As is apparent, any number of actuating mechanisms 20 can be placed about the length of the conveyor 12 to expand and contract the paint wagon 10 as desired. Preferably, the paint wagons 10 are contracted to turn corners and expanded for painting, mounting and dismounting parts to be painted onto and from the paint wagon 10. The actuating mechanisms 20 have a low profile minimizing risk of contact by fork lift trucks and workers. Additionally, actuating mechanisms 20 are mounted directly under the path of travel of the paint wagons 10 and therefore not in an area normally accessed by workers.

While presently preferred embodiments of the present invention are described herein, variations and modifications will occur to those skilled in the art and should not be considered as departing from the scope of the invention as defined by the appended claims. floor 16. The contracting actuating mechanism 20 is a mirror image of the mechanism shown in the FIGS. 7, 8, and 9. The rack of teeth 122 will be on the opposite side of the bar 110 and will rotation of the spur gear 94 in a contracting sense opposite the expanding sense.

Rotation of the spur gear 94 in the contracting sense will cause rotation of the pinion 70 in the contracting sense. Pinion 70 will cause racks 84, 86 to move inwardly. Racks 84, 86, will move the outer cars 56 inwardly which will urge middle cars 54 inwardly and then inner cars 52 inwardly to the contracted position. Bars 68 will space the outer cars 56 from the middle cars 54 from the inner cars 52. By selecting the length of bars 68, a minimum spacing between supports 126 is determined.

As is apparent, any number of actuating mechanisms 20 can be placed about the length of the conveyor 12 to expand and contract the paint wagon 10 as desired. Preferably, the paint wagons 10 are contracted to turn corners and expanded for painting, mounting and dismounting parts to be painted onto and from the paint wagon 10. The actuating mechanisms 20 have a low profile minimizing risk of contact by fork lift trucks and workers. Additionally, actuating mechanisms 20 are mounted directly under the path of travel of the paint wagons 10 and therefore not in an area normally accessed by workers.

While presently preferred embodiments of the present invention are described herein, variations and modifications will occur to those skilled in the art and should not be considered as departing from the scope of the invention as defined by the appended claims.

We claim:

1. A paint wagon comprising:

a base having a plurality of wheels mounted in supporting relation thereto;

a drop pin slidably mounted to said base, said drop pin selectively engagable with a conveyor for translating said paint wagon along a path;

a plurality of slidably mounted mounting fixtures, said fixtures movable between a contracted position and an expanded position, an actuating assembly slidably mounting said mounting fixtures to said base, said actuating assembly comprising:

a longitudinal support mounted to said base, a plurality of cars in sliding engagement with said longitudinal support, said plurality of cars each having one of said mounting fixture extending therefrom, a rotatably mounted pinion, a first rack slidably mounted with said longitudinal support, said pinion in driving engagement with said first rack, said first rack connected to an outer one of said cars, said first rack having a plurality of tabs extending therefrom positioned to selectively engage inner ones of said cars to move said inner ones outwardly and automatically space said cars, wherein rotation of said pinion effects said movement of said mounting fixtures between the contracted and expanded positions.

2. A paint wagon as claimed in claim 1 wherein each of said cars has a bar positioned to space said plurality of cars from an adjacent car upon moving said mounting fixtures to said contracted position.

3. A paint wagon as claimed in claim 2 wherein said paint wagon further comprises a second rack slidably mounted with said longitudinal support, said pinion in driving engagement with said second rack, said second rack connected to an outer one of said cars, said second rack having an plurality of tabs extending therefrom positioned to selectively engage inner ones of said cars to move said inner ones outwardly and automatically space said cars when moving to the expanded condition.

4. A paint wagon as claimed in claim 3 wherein said second racks extends in a direction opposite to said first rack.

5. A paint wagon as claimed in claim 4 wherein said paint wagon has a fixed mounting fixture positioned between mounting fixtures operatively engaging said first rack and mounting fixtures operatively engaging said second rack.

6. A paint wagon as claimed in claim 5 wherein said actuating assembly further comprises a downwardly extending shaft having a gear mounted thereon, said shaft operatively engaging said pinion, said gear positioned to engage a complementary rack of teeth fixed relative to said paint wagon such that as said paint wagon translates along said path said gear rotates effecting rotation of said pinion.

7. A paint wagon as claimed in claim 6 wherein said actuating assembly further comprises a lock shaft slidable mounted in front of said shaft, said shaft movable between a lowered position and a raised position, said lock shaft engaging said shaft preventing rotation thereof when said lock shaft is in said lowered position and said lock shaft disengaging from said shaft when said lock shaft is in said raised position.

8. A paint wagon as claimed in claim 7 wherein said paint wagon has a housing to shroud operative components of said paint wagon from paint spray.

9. A paint wagon as claimed in claim 8 wherein said longitudinal support is a C-shaped section having an elongated open channel defining upper and lower guides, and each of said cars has a plurality of rotatably mounted wheels engaging said upper and lower guides.

10. A paint wagon as claimed in claim 9 wherein said paint wagon has at least three cars and said inner ones of said cars comprise an inner car and a middle car positioned between said outer one of said cars and said inner car, said inner car having a tab on a leading edge when said inner car is moving in an expanding direction, said inner car tab engaging one of said plurality of tabs on a respective rack and said middle car having a tab on a trailing edge when said middle car is moving in an expanding direction, said middle car tab engaging another of said plurality of tab on a respective rack.

11. A paint wagon as claimed in claim 10 wherein said plurality of tabs on said rack project orthogonally therefrom.

12. A paint wagon as claimed in any preceding claim, in combination with an actuating mechanism mounted along said path, said actuating assembly selectively engaging said actuating mechanism as said paint wagon travels along said path responsively effecting rotation of said pinion and to effect said movement of said mounting fixtures between the contracted and expanded positions.

13. A combination as claimed in claim 12 wherein said actuating mechanism comprises:

a housing having an upwardly extending slot for receiving said drop pin as said paint wagon travels past said actuating mechanism, a pivotally mounting bar presenting a ramp and an elevated surface effecting movement of said lock shaft between said lowered and raised positions, a stop, and said rack of teeth slidably mounted to cooperate with said bar, said rack of teeth biased to a leading edge of said actuating mechanism, said bar biased to urge said rack of teeth into engagement with said gear, said rack of teeth slideable relative to said bar when said gear stops rotating until said rack of teeth engages said stop whereupon said stop pivots said rack of teeth out of engagement with said gear.

14. A combination as claimed in claim 13 further comprising a series of actuating members positioned along said path for alternately effecting movement of said mounting fixtures between said contracted and expanded positions.

* * * * *

UNITED STATES PATENT AND TRADEMARK OFFICE

CERTIFICATE OF CORRECTION

PATENT NO. : 6,705,233 B2
DATED : March 16, 2004
INVENTOR(S) : Spiewak et al.

It is certified that error appears in the above-identified patent and that said Letters Patent is hereby corrected as shown below:

Column 7,
Line 11, "racks" should be -- rack --.

Column 8,
Line 8, "tab" should be -- tabs --.

Signed and Sealed this

Twenty-ninth Day of June, 2004

JON W. DUDAS
*Acting Director of the United States Patent and Trademark Office*